Figure 1:
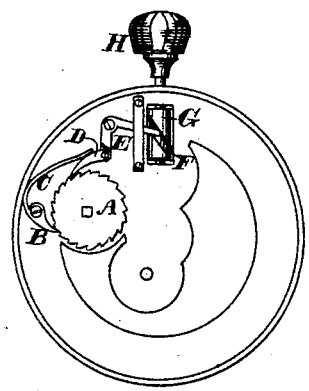

A. TROLLER.
STEM WINDING DEVICE FOR WATCHES.

No. 182,392. Patented Sept. 19, 1876.

Witnesses
Geo. H. Strong.
Jno. L. Boone

Inventor
Albert Troller
by Dewey & Co.
Attys

UNITED STATES PATENT OFFICE.

ALBERT TROLLER, OF SAN FRANCISCO, CALIFORNIA.

IMPROVEMENT IN STEM-WINDING DEVICES FOR WATCHES.

Specification forming part of Letters Patent No. 182,392, dated September 19, 1876; application filed July 13, 1876.

*To all whom it may concern:*

Be it known that I, ALBERT TROLLER, of San Francisco, county of San Francisco and State of California, have invented a Stem-Winding Device for Watches; and I do hereby declare the following description and accompanying drawings are sufficient to enable any person skilled in the art or science to which it most nearly appertains to make and use my said invention without further invention or experiment.

My invention relates to a cheap and simple device for winding watches by the turning of the stem; and it consists of a spirally-slotted barrel, which is turned alternately in one direction and the other by the stem, and the slot acts upon one end of a knee-lever. The opposite end of this knee-lever actuates a pawl, so as to turn the winding-ratchet, as will be more fully described in the accompanying drawings, in which—

Figure 1 is a plan view of the device.

A is the winding-ratchet of a watch, and B is the pawl which holds it to its place and prevents its turning backward. The back end of this pawl is drawn out so as to form a spring, C, which rests upon the dog D, and this serves the double purpose of holding both the pawl B and dog D in contact with the teeth of the ratchet. The opposite end of the dog is pinned to one arm of a bell-crank lever, E, as shown, and the lever has its fulcrum at the angle. The other end of the lever enters a slot, F, which is made spirally around a small cylinder, G. This cylinder is mounted upon the same shaft or spindle with the crown H, and when the crown is turned in each direction, alternately, the rotation of the cylinder will cause the end of the lever E to travel from one end to the other of the cylinder, by reason of the spiral slot.

The operation will then be as follows: The crown H is held between the thumb and finger, and without letting go is rotated in one direction and the other, thus causing the lever E to vibrate about its point of suspension or fulcrum. This action forces the dog D forward and rotates the ratchet-wheel A, and then withdraws the dog for a new rotation of the wheel, the pawl B holding the ratchet to its place and preventing a backward rotation.

The mechanism is simple, and can be easily repaired by any watch-maker, and in its operation does not necessitate the releasing of the crown until the watch is wound up.

Having thus described my invention, what I claim, and desire to secure by Letters Patent, is—

A winding device for watches, consisting of the spirally-grooved cylinder G, operated by the crown H, in combination with the bell-crank lever E, dog D, winding-ratchet A, and pawl B or equivalent device, substantially as and for the purpose herein described.

In witness whereof I have hereunto set my hand and seal.

-ALBERT TROLLER. [L. S.]

Witnesses:
 GEO. H. STRONG,
 CHAS. G. PAGE.